Figure 1:
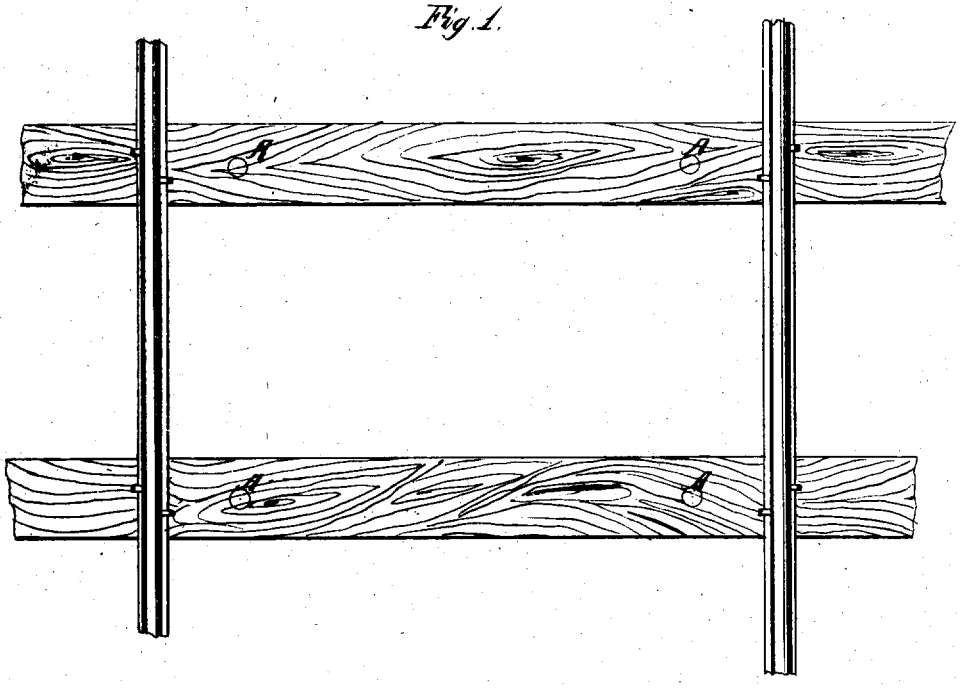
Figure 2:
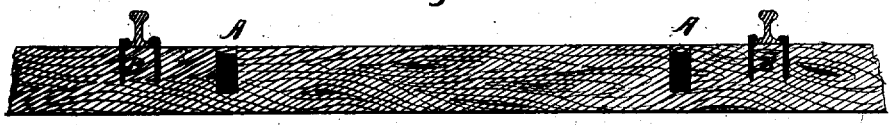

Benjamin S. Foreman.

Preserving Rail-Road Ties.

4360

REISSUED MAY 2 1871

Scale 1 Inch to the Foot.

Benjamin S. Foreman

Witnesses

Elias Lealeman

Henry Mino

Inventor.

By West & Bond his Attorneys

THE NORRIS PETERS CO., WASHINGTON, D. C.

United States Patent Office.

BENJAMIN S. FOREMAN, OF MORRISON, ILLINOIS.

Letters Patent No. 43,191, dated June 21, 1864; reissue No. 1,951, dated May 9, 1865; reissue No. 4,360, dated May 2, 1871.

IMPROVEMENT IN PRESERVING WOOD, RAILROAD TIES, &c.

The Schedule referred to in these Letters Patent and making part of the same.

*To all whom it may concern:*

Be it known that I, BENJAMIN S. FOREMAN, of the town of Morrison, in the county of Whiteside and State of Illinois, have invented a new and improved Mode of Preserving Wood.

For this purpose I use a new composition, consisting of salt, corrosive sublimate, and arsenic, prepared as follows:

To one pound of common salt I add three ounces of corrosive sublimate and three ounces of arsenic, and thoroughly mix and incorporate these ingredients together. The composition is then ready to be applied, and may be used either dry or in solution, as may be desired.

A convenient mode of applying the composition to wood is as follows:

At or near the places likely to rot, and in the upper side of ties and foundation timbers, and near the ground-line of posts, bore a hole corresponding in depth and size with the size of the timber used—say two inches in diameter and five inches in depth for a stick from eight to twelve inches in diameter or cross-section—and in such hole place a sufficent quantity of the composition to fill the hole to within about one inch of the top, and then drive in a plug so as to insure the retention of the composition, as shown.

I usually make the plug of wood, about one inch thick, and prefer to have the grain of the plug run parallel with that of the timber to be preserved.

In long timbers I make these insertions from one to eight feet apart, according to the character of the wood and the purpose for which it is to be used.

I regard the proportions of the ingredients above given as the best, but the same may be varied somewhat.

This compound will prevent wood and many other substances from rotting, is a preventive against grubs and insects, is a protection against fire, and hardens the substance with which used so that nails and spikes will hold in soft woods which have been treated with this composition.

The mode of using the composition may be varied according to circumstances.

What I claim as new is as follows:

1. The herein-described composition, consisting of salt, corrosive sublimate, and arsenic, substantially as specified.

2. The mode herein described of preserving wood, by the application of the composition described, substantially as specified.

B. S. FOREMAN.

Witnesses:

C. J. JOHNSON,

GEO. H. FAY.